Sept. 16, 1958 J. E. WALKEY 2,852,579
TWO-STAGE PROPYLENE POLYMERIZATION PROCESS
Filed June 30, 1954
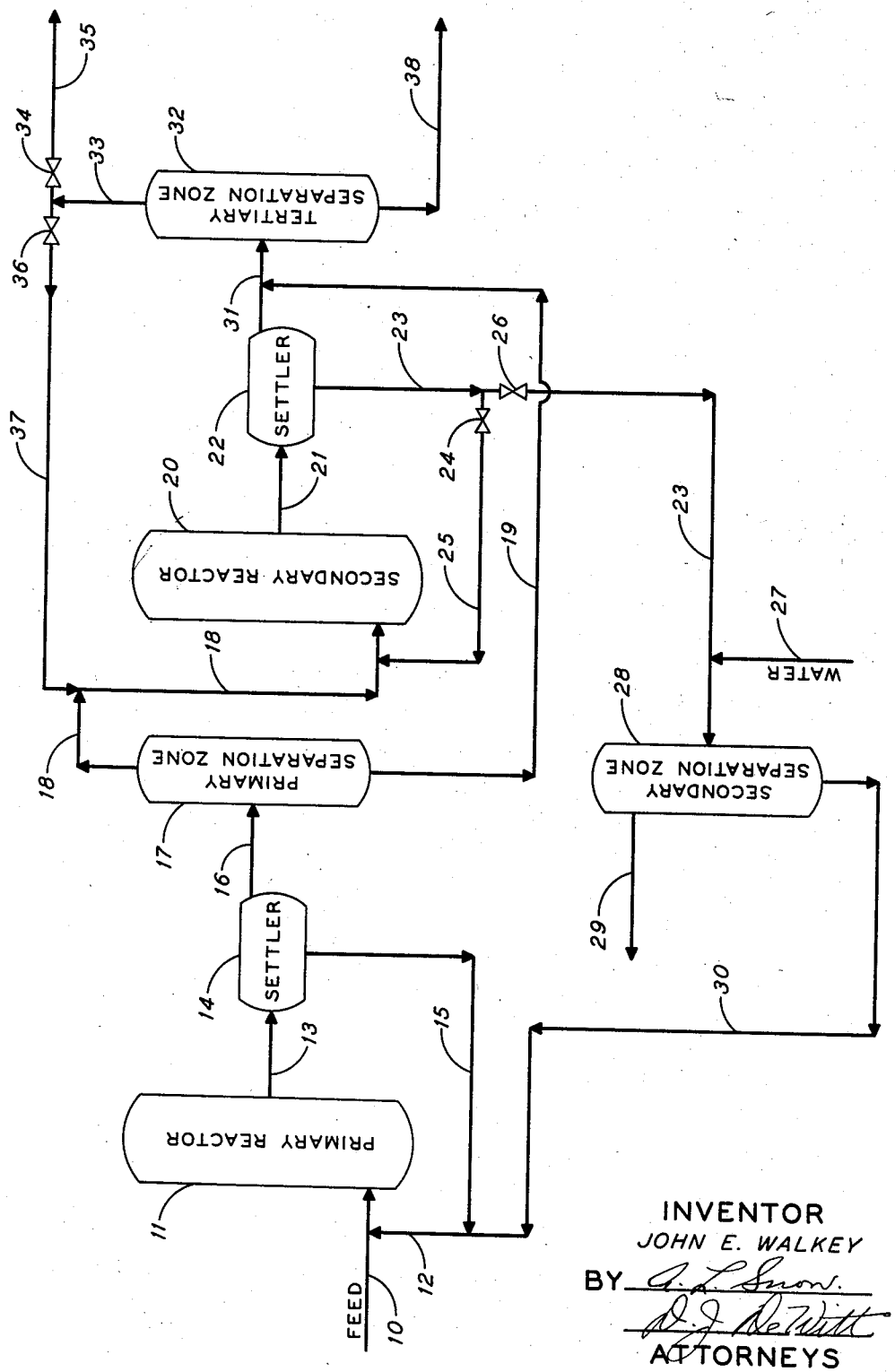
INVENTOR
JOHN E. WALKEY
BY
ATTORNEYS

2,852,579

TWO-STAGE PROPYLENE POLYMERIZATION PROCESS

John E. Walkey, San Anselmo, Calif., assignor to California Research Corporation, San Francisco, Calif., a corporation of Delaware Application June 30, 1954, Serial No. 440,360

7 Claims. (Cl. 260—683.15)

This invention relates to a process for the polymerization or propylene and more particularly to a two-stage polymerization process conducted in the presence of liquid phosphoric acid catalyst.

In the past, propylene has been polymerized to produce liquid hydrocarbons. It has long been known that inorganic acids, particularly phosphoric acid, catalyze the polymerization of olefins. Many polymerization processes and catalysts have been advanced. Among them are processes employing bulk liquid phosphoric acid; acid-film type of phosphoric acid wherein the acid is disposed as a thin film on an inert, nonporous support such as quartz, as described, for example, in U. S. Patents Nos. 2,135,793 and 2,186,021; and the metal pyrophosphates, e. g., copper pyrophosphate, described, for example, in U. S. Patents Nos. 2,310,161 and 2,414,206. Unusually good catalysts are the bulk liquid phosphoric acid and the acid-film, the latter preferably having a film of acid disposed on crushed quartz particles of the order of 28–35 mesh, as taught in U. S. Patent No. 2,579,433.

These polymerization processes are normally directed to the production of liquid polymers for specific uses. For example, it has been found that the higher polymers of propylene, such as the tetramer and pentamer, may be used to alkylate benzene and that the reaction product may be sulfonated to produce a detergent of superior quality. The polymers produced in a polymerization process directed to such an end normally have an initial boiling point of over 350° F.

Even older in the art is the propylene polymerization to produce liquid hydrocarbons boiling in the gasoline range. These polymers, due to their high octane number, are normally used as blending stocks, i. e., they are blended with low octane gasolines to create specification motor fuels. However, most commercial polymerization processes so employed use such conditions of temperature, pressure, space velocity and catalyst concentrations that the propylene polymers produced contain comparatively large amounts of $C_9$ polymers, with the total polymer having an initial boiling point of about 150° F. to 200° F., a 50% point of about 275° F. to 325° F., and an end point above 400° F.

A more ideal polymer for use as a gasoline blending stock would be one composed of $C_6$ hydrocarbons because of their lower boiling range and density. However, to polymerize propylene to essentially $C_6$ polymers requires such conditions of temperature, pressure, catalyst concentration and space velocity, that a process directed to that end is extremely disadvantageous since the rate of polymerization is so low that extremely large catalyst contacting vessels or extremely low space velocities must be employed.

It is an object of this invention to provide an improved process for the conversion of normally gaseous propylene to highly volatile liquid hydrocarbon polymers boiling in the gasoline range. Still another object is to provide a process for the production of liquid polymers for use as gasoline blending stocks in which the disadvantages of large catalyst contacting vessels or low space velocities are overcome. Further objects will be apparent from the following description of the present invention.

It has been found, in accordance with the subject invention, that when the polymerization of propylene is carried out in two separate stages, employing critical conditions of temperature, pressure, space velocity and liquid phosphoric acid concentration in each stage, that the production of a liquid polymer of high volatility at high yields for use as a gasoline blending stock is accomplished and that when this polymer product is blended with heavy gasolines, the total quantity of specification gasoline so formed per volume of polymerization catalyst employed is greater than that obtained in the past.

According to the present invention, a propylene-containing feed stream is passed at an L. H. S. V. (Liquid Hourly Space Velocity or volumes of liquid feed per volume of catalyst per hour) above 0.15 into contact with a phosphoric acid catalyst having a concentration of from 50 to 90 percent in a primary polymerization zone comprising a primary reactor. The polymerization reaction in the primary zone is carried out at a temperature in the range of from about 350° F. to 500° F. and at a pressure in the range of from about 300 to 2000 p. s. i. g. to convert from 30 to 60 percent of the propylene contained in the feed stream to hydrocarbons boiling substantially in the range of from about 100° F. to 200° F. The hydrocarbon effluent from the primary polymerization zone is recovered and subjected to flash distillation so as to separate an overhead fraction containing substantially all of the unreacted propylene and a bottoms fraction containing substantially all of the primary polymer. The overhead fraction is then passed at an L. H. S. V. above 0.15 into contact with a phosphoric acid catalyst having a concentration of from 100 to 110 percent in a secondary polymerization zone. The secondary polymerization zone, comprising a secondary reactor, is maintained at a temperature in the range of from about 300° F. to 400° F. and at a pressure in the range of from about 250 to 1500 p. s. i. g. The hydrocarbon effluent from the secondary polymerization zone is recovered and mixed with the primary polymer from the primary polymerization zone and the mixture is passed into a separation zone wherein the unreacted hydrocarbon components are removed overhead and a liquid polymer product is removed as a bottoms fraction.

The process of the invention may be readily understood by reference to the appended figure which is a diagrammatic illustration of a process flow suitable for the practice of the present invention. No attempt is made to include any of the necessary pumps, heat exchangers, control equipment and the like, since any person skilled in the art may readily supply them.

A feed ordinarily containing above about 20% propylene and substantially free of hydrocarobns heavier than propane is treated by conventional methods to remove any hydrogen sulfide and mercaptans present. The feed is then passed by line 10 into the primary reactor 11 which constitutes the first polymerization zone. Primary reactor 11 may contain either of the following two types of catalyst. One is the so-called acid-film type, which is prepared by wetting a clean, nonporous, nonreactive material with phosphoric acid. The preferable support is 28–35 mesh quartz. The second catalyst that may be employed in the present process is the so-called bulk-acid type which is concentrated liquid phosphoric acid. The figure is directed to the process employing the latter type catalyst. In either case, the phosphoric acid concentration is the same and just as critical in that it must be in the range of from about 50 to 90 percent acid. The procedure for initially charging the reactor 11 is described in U. S. Patents Nos. 2,135,793 and 2,186,021 (acid-film type) and U. S. Patent No. 2,592,428 (bulk-acid type).

If the acid-film type catalyst is employed, the feed is passed through the catalyst bed, and if the bulk-acid type is used, the feed is vigorously and intimately mixed with the liquid acid which is continuously supplied through line 12. The reaction is conducted at a temperature maintained in the range of from about 350° F. to 500° F. and at a pressure in the range of from about 300 to 2000 p. s. i. g. The feed is contacted with the acid at a space velocity above 0.15 L. H. S. V. Under these conditions, a conversion of propylene to liquid polymers of predominantly $C_6$ hydrocarbons in the range of from about 30 to 60 percent of the propylene contained in the feed is obtained. The liquid polymers so produced will boil predominantly in the range from about 100° F. to 200° F.

When bulk liquid $H_3PO_4$ is employed as the catalyst, a mixture of hydrocarbon and acid is withdrawn from reactor 11 through line 13 and passed into settler 14 where the mixture is settled to form an upper hydrocarbon layer and a lower acid layer. The acid layer is continuuosly withdrawn from settler 14 by line 15 from which it may be passed into line 12 and returned to the primary reactor 11.

The hydrocarbon layer is continuously withdrawn from settler 14 by line 16. In line 16 the pressure is reduced to a level intermediate to the primary and secondary reactors. This may be accomplished by any conventional pressure regulator. The hydrocarbons removed from settler 14 are passed through line 16 to primary separation zone 17 where the hydrocarbons are depropanized. Primary separation zone 17 may be a conventional distillation column or a flash vaporization vessel. Hydrocarbons boiling below about 100° F., including propane and unreacted propylene, are withdrawn overhead from the primary separation zone 17 by line 18 and the heavier hydrocarbons consisting essentially of propylene polymers boiling in the range of from about 100° F. to 200° F. are withdrawn from separation zone 17 by line 19.

The light hydrocarbon overhead separated in primary separation zone 17 is passed through line 18 into the secondary reactor 20 which constitutes the secondary polymerization zone. In the secondary reactor 20 the hydrocarbon stream entering said zone through line 18 is contacted with either an acid-film or bulk-acid catalyst of the same type heretofore described in respect to the primary reactor 11 except that the conditions of temperature, pressure, and phosphoric acid concentration are not the same. The polymerization reaction in reactor 20 is carried out at a temperature in the range of from about 300° F. to 400° F., a pressure in the range of from about 250 to 1500 p. s. i. g., a space velocity above 0.15 L. H. S. V., and a phosphoric acid concentration in the range of from 100 to 110 percent, based upon orthophosphoric acid.

The present invention contemplates a total propylene conversion of about 90 percent in the two stages. In the primary reactor 11, a propylene conversion in the range of 30 to 60 percent of the propylene contained in the feed is obtained. Therefore, in the secondary reactor 20, a propylene conversion of from 60 to 30 percent, based on the total feed to reactor 11, is obtained.

In secondary reactor 20, the propylene conversion is to liquid polymers of essentially $C_9$ hydrocarbons generally boiling in the range of from about 180° F. to 450° F.

A mixture of hydrocarbon and acid is withdrawn from the secondary reactor 20 through line 21 and passed into a second settler 22 where the mixture is settled to form an upper hydrocarbon layer and a lower acid layer. Settler 22 may be operated in the same manner as settler 14 in that the acid layer may be continuously removed and recycled to the secondary reactor 20. A preferred manner of operation is shown in the figure. The phosphoric acid layer is removed through line 23 and a portion of it is recycled to the secondary reactor 20 by passing it through valve 24 and lines 25 and 18. The remaining portion of the acid is passed through valve 26 in line 23 wherein the acid is mixed with water added through line 27 and passed into secondary separation zone 28. Enough water is added through line 27 to reduce the concentration of the phosphoric acid to the concentration required in the primary reactor 11, i. e., in the range of from about 50 to 90 percent.

As noted above, the water and acid mixture is passed into the secondary separation zone 28 (which may be a settling vessel, centrifugal separator, decanter, etc.) where an upper nonaqueous layer is formed which contains previously unremoved compounds such as ammonia, methyl amine, hydrogen sulfide and mercaptans, and also coke and tarry materials produced during the polymerization reaction. These compounds and materials tend to reduce the effectiveness of phosphoric acid as a catalyst and, therefore, are removed from the system by line 29. A bottom layer of phosphoric acid of concentration in the range from about 50 to 90 percent is passed from secondary separation zone 28 through line 30 into line 12, from which it passes into primary reactor 11.

The upper hydrocarbon layer formed in settler 22 is continuously withdrawn from settler 22 by line 31 and passed into tertiary separation zone 32. The propylene polymers produced in primary reactor 11 and separated in primary separation zone 17 are preferably passed through line 19 into line 31 where they mix with the hydrocarbons removed from settler 22. In the tertiary separation zone 32, which is ordinarily a distillation column termed a "stabilizer," the propane, unreacted proylene, and lighter gases are withdrawn as an overhead by line 33. Portions of this overhead are removed from the system by passing the portion through valve 34 and line 35. The remaining overhead may be recycled to the primary or secondary reactor, or both. The figure shows a recycle to the secondary reactor 20 by passing the recycle overhead through valve 36 and lines 37 and 18.

The bottoms from tertiary separation zone 32, composed of a mixture of light propylene polymer produced in primary reactor 11 and heavier polymer produced in secondary reactor 20, is removed by line 38. This bottoms mixture comprises the product of the polymerization process of the present invention and is an excellent blending stock for upgrading heavy gasoline because of its markedly higher volatility over polymers obtained by conventional propylene polymerization processes. As noted hereinbefore, the propylene polymers produced in conventional processes contain comparatively large amounts of $C_9$ polymers, with the total polymer having a 50 percent distillation point in the range of about 275° F. to 325° F. In the present process, however, due to the partial conversion of propylene to predominantly $C_6$ polymers in the primary reactor, the total polymer product removed from the process by line 38 will have a 60 percent distillation point generally in the range from 220° F. to 260° F. Thus, quantities of heavy gasoline that, because of its relatively high boiling range could not be used as motor fuel gasoline and would have to be sold as a less valuable product, may be blended with the propylene polymer product of the present invention to produce valuable motor fuel of specification volatility. Furthermore, the present invention provides a process for the production of propylene polymers that, when blended with heavy gasoline, produces more high octane gasoline at minimum quantities of catalyst, which means minimum reactor size, than that obtained in the past. This result is shown in the following examples, of which Example I is carried out pursuant to the present invention and Examples II and III show other polymerization processes for comparative purposes. In all three of the examples, the following items are identical:

(1) The catalyst is liquid phosphoric acid deposited as a film on 28–35 mesh quartz.
(2) The feed contains 48 volume percent propylene.
(3) 90 percent of the propylene contained in the feed is converted to propylene polymer.
(4) The heavy gasoline which the polymer is blended with boils in the range of from 380° F. to 450° F.
(5) The feed rate.
(6) The blended gasoline with a 50 percent distillation point of 305° F.

Example I 41 percent of the propylene in the feed is converted to a liquid polymer by passing the feed into the primary polymerization zone and contacting it with 75 percent phosphoric acid at an average temperature of 450° F. and a pressure of 1800 p. s. i. g. 49 percent of the propylene in the original feed is converted to a liquid polymer by passing the effluent from the primary polymerization zone into the secondary polymerization zone and contacting it with 101.5 percent phosphoric acid at an average temperature of 360° F. and a pressure of 360 p. s. i. g. The mixture of propylene polymers is blended with a heavy gasoline to produce a blended gasoline with a 50 percent distillation point of 305° F. A total of 0.32 barrel of blended gasoline per day per cubic foot of catalyst is obtained.

Example II

In this example, 90 percent of the propylene present is converted in a single polymerization zone by contacting the feed under identical conditions as in the primary polymerization zone in Example I, i. e., 75 percent orthophosphoric acid, an average temperature of 450° F. and a pressure of 1800 p. s. i. g. The polymer product is blended with the same heavy gasoline as in Example I to produce blended gasoline. A total of 0.18 barrel of the blended gasoline per day per cubic foot of catalyst is obtained.

Example III

In this example, 90 percent of the propylene contained in the feed is converted in a single polymerization zone by contacting the feed under identical conditions as in the secondary polymerization zone in Example I, except that the orthophosphoric acid concentration is 103.2 percent. The polymer product here cannot be blended with a heavy gasoline since the propylene polymer here has the same 50 percent point of 305° F. as the blended gasoline produced in Examples I and II. Therefore, a total of 0.25 barrel of gasoline per day per cubic foot of catalyst is obtained.

The above examples clearly point out that the maximum blended gasoline, utilizing propylene polymer as the blending agent with heavy gasoline, is realized at minimum catalyst requirements by employing the process of the present invention.

I claim:

1. A process for the polymerization of propylene which comprises contacting a propylene-containing feed stream, containing above about 20% propylene and substantially free from hydrocarbons heavier than propane, with a liquid phosphoric acid catalyst of a concentration in the range of from about 50 to 90 percent $H_3PO_4$ in a primary polymerization zone at a temperature in the range of from about 350° F. to 500° F., a pressure in the range of from about 300 to 2000 p. s. i. g., and a space velocity above 0.15 L. H. S. V. to convert from 30 to 60 percent of the propylene contained in said feed stream predominantly to hydrocarbons boiling in the range of from about 100° F. to 200° F.; recovering the hydrocarbon effluent from said primary polymerization zone and passing said effluent into a primary separation zone to separate an overhead fraction boiling below about 100° F. and a bottoms fraction boiling above said temperature; contacting said overhead fraction with a liquid phosphoric acid catalyst of a concentration in the range of from about 100 to 110 percent $H_3PO_4$ in a secondary polymerization zone at a temperature in the range of from about 300° F. to 400° F., a pressure in the range of from about 250 to 1500 p. s. i. g. and a space velocity above 0.15 L. H. S. V.; recovering the hydrocarbon effluent from said secondary polymerization zone and passing said effluent into a secondary separation zone to separate an overhead fraction boiling below about 100° F and a bottoms fraction boiling above said temperature, and mixing said bottoms fractions from said primary and secondary separation zones to form the desired polymer product.

2. A process for the polymerization of propylene which comprises contacting a propylene-containing feed stream, containing above about 20% propylene and substantially free from hydrocarbons heavier than propane, with a liquid phosphoric acid catalyst of a concentration in the range of from about 50 to 90 percent $H_3PO_4$ in a primary polymerization zone at a temperature in the range of from about 350° F. to 500° F., a pressure in the range of from about 300 to 2000 p. s. i. g., and a space velocity above 0.15 L. H. S. V. to convert from 30 to 60 percent of the propylene contained in said feed stream predominantly to propylene polymers boiling in the range of from about 100° F. to 200° F.; recovering the hydrocarbon effluent from said primary polymerization zone and passing said effluent into a primary separation zone to separate an overhead fraction containing substantially all of the unreacted propylene and a bottoms fraction containing substantially all propylene polymer; contacting said overhead fraction with a liquid phosphoric acid catalyst of a concentration in the range of from about 100 to 110 percent $H_3PO_4$ in a secondary polymerization zone at a temperature in the range of from about 300° F. to 400° F., a pressure in the range of from about 250 to 1500 p. s. i. g. and a space velocity above 0.15 L. H. S. V.; recovering the hydrocarbon effluent from said secondary polymerization zone and passing said effluent into a secondary separation zone to separate an overhead fraction containing substantially all of the unreacted propylene and a bottoms fraction containing propylene polymer, and mixing said bottoms fractions from said primary and secondary separation zones to form the desired polymer product.

3. A process for the polymerization of propylene which comprises contacting a propylene-containing feed stream, containing above about 20% propylene and substantially free from hydrocarbons heavier than propane, with a liquid phosphoric acid catalyst of a concentration in the range of from about 50 to 90 percent $H_3PO_4$ in a primary polymerization zone at a temperature in the range of from about 350° F. to 500° F., a pressure in the range of from about 300 to 2000 p. s. i. g., and a space velocity above 0.15 L. H. S. V. to convert from 30 to 60 percent of the propylene contained in said feed stream predominantly to hydrocarbons boiling in the range of from about 100° F to 200° F.; recovering the hydrocarbon effluent from said primary polymerization zone and passing said effluent into a primary separation zone to separate an overhead fraction containing substantially all of the unreacted propylene and a bottoms fraction containing substantially all propylene polymer; contacting said overhead fraction with a liquid phosphoric acid catalyst of a concentration in the range of from about 100 to 110 percent $H_3PO_4$ in a secondary polymerization zone at a temperature in the range of from about 300° F. to 400° F., a pressure in the range of from about 250 to 1500 p. s. i. g., and a space velocity above 0.15 L. H. S. V.; recovering a hydrocarbon effluent from said secondary polymerization zone, forming a mixture of the hydrocarbon effluent from said secondary polymerization zone and the bottoms fraction from said primary separation zone, and passing said mixture into a secondary separation zone to separate an overhead fraction boiling below about 100° F and a bottoms fraction boiling above said temperature as the desired polymer product.

4. The process of claim 3 wherein the last mentioned overhead fraction is recycled to at least one of the polymerization zones.

5. A process for the polymerization of propylene which comprises contacting a propylene-containing feed stream, containing above about 20% propylene and substantially free from hydrocarbons heavier than propane, with a liquid phosphoric acid catalyst of a concentration in the range of from about 50 to 90 percent $H_3PO_4$ in a primary polymerization zone at a temperature in the range of from about 350° F. to 500° F., a pressure in the range of from about 300 to 2000 p. s. i. g., and a space velocity above 0.15 L. H. S. V. to convert from 30 to 60 percent of the propylene contained in said feed stream predominantly to propylene polymers boiling in the range of from about 100° F. to 200° F.; passing the effluent from said primary polymerization zone into a first settler to separate an upper hydrocarbon layer and a lower acid layer, withdrawing said acid layer and returning it to said primary polymerization zone, withdrawing said upper hydrocarbon layer from the settler and passing it into a primary separation zone to separate an overhead fraction containing substantially all of the unreacted propylene and a bottoms fraction containing substantially all of the propylene polymer formed in the primary polymerization zone; contacting said overhead fraction with a liquid phosphoric acid catalyst of a concentration in the range of from 100 to 110 percent $H_3PO_4$ in a secondary polymerization zone at a temperature in the range of from about 300° F. to 400° F., a pressure in the range of from about 250 to 1500 p. s. i. g., and a space velocity above 0.15 L. H. S. V.; passing the effluent from said secondary polymerization zone into a second settler to separate an upper hydrocarbon layer and a lower acid layer; continuously withdrawing said acid layer from said second settler and returning it to said secondary polymerization zone, withdrawing said upper hydrocarbon layer from said second settler and admixing it with the bottoms fraction from said primary separation zone, and passing the resulting mixture into a secondary separation zone to separate an overhead fraction boiling below about 100° F. and a bottoms fraction boiling above said temperature as the desired polymer product.

6. The process of claim 5 wherein a portion of the acid layer from the second settler is mixed with water to form an acid mixture of a concentration in the range of about 50 to 90 percent $H_3PO_4$; passing said acid mixture into a settler to separate an upper hydrocarbon layer and a lower acid layer, and passing said last mentioned acid layer into the primary polymerization zone.

7. The process of claim 5 wherein the last mentioned overhead fraction is recycled to at least one of the polymerization zones.

References Cited in the file of this patent

UNITED STATES PATENTS

| | | |
|---|---|---|
| 2,116,157 | Morrell | May 3, 1938 |
| 2,176,354 | Nelson | Oct. 17, 1939 |
| 2,415,951 | Kirkbride et al. | Feb. 18, 1947 |
| 2,620,361 | Karchmer | Dec. 2, 1952 |